US010870307B2

(12) United States Patent
Kecht et al.

(10) Patent No.: US 10,870,307 B2
(45) Date of Patent: Dec. 22, 2020

(54) SECURITY PIGMENT BASED ON CORE-SHELL PARTICLES, AND PRODUCTION METHOD

(71) Applicant: GIESECKE+DEVRIENT CURRENCY TECHNOLOGY GMBH, Munich (DE)

(72) Inventors: Johann Kecht, Munich (DE); Axel Schlossbauer, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 267 days.

(21) Appl. No.: 15/774,137

(22) PCT Filed: Nov. 9, 2016

(86) PCT No.: PCT/EP2016/001861
§ 371 (c)(1),
(2) Date: May 7, 2018

(87) PCT Pub. No.: WO2017/080652
PCT Pub. Date: May 18, 2017

(65) Prior Publication Data
US 2018/0311991 A1  Nov. 1, 2018

(30) Foreign Application Priority Data

Nov. 11, 2015  (DE) .................. 10 2015 014 539

(51) Int. Cl.
| | | |
|---|---|---|
| *B01J 13/04* | (2006.01) | |
| *B01J 13/16* | (2006.01) | |
| *B42D 25/378* | (2014.01) | |
| *C09D 11/037* | (2014.01) | |
| *C09K 11/06* | (2006.01) | |
| *C09B 67/08* | (2006.01) | |
| *C09B 67/02* | (2006.01) | |
| *G07D 7/00* | (2016.01) | |
| *G07D 7/1205* | (2016.01) | |
| *B42D 25/382* | (2014.01) | |
| *B42D 25/387* | (2014.01) | |
| *C09D 11/50* | (2014.01) | |
| *C09B 67/22* | (2006.01) | |
| *C09K 11/02* | (2006.01) | |

(Continued)

(52) U.S. Cl.
CPC ............ *B42D 25/378* (2014.10); *B01J 13/04* (2013.01); *B01J 13/16* (2013.01); *B01J 13/18* (2013.01); *B01J 13/206* (2013.01); *B01J 13/22* (2013.01); *B42D 25/355* (2014.10); *B42D 25/373* (2014.10); *B42D 25/382* (2014.10); *B42D 25/387* (2014.10); *C08K 3/013* (2018.01); *C08K 5/0041* (2013.01); *C08L 25/06* (2013.01); *C08L 33/12* (2013.01); *C08L 61/06* (2013.01); *C08L 61/12* (2013.01); *C08L 61/24* (2013.01); *C08L 61/28* (2013.01); *C08L 61/30* (2013.01); *C08L 61/34* (2013.01); *C09B 67/0013* (2013.01); *C09B 67/0033* (2013.01); *C09B 67/0097* (2013.01); *C09D 11/037* (2013.01); *C09D 11/50* (2013.01); *C09K 11/02* (2013.01); *C09K 11/025* (2013.01); *C09K 11/06* (2013.01); *D21H 21/30* (2013.01); *D21H 21/40* (2013.01); *G07D 7/003* (2017.05); *G07D 7/1205* (2017.05); *B42D 25/29* (2014.10); *G07D 2207/00* (2013.01)

(58) Field of Classification Search
CPC .......... B01J 13/16; B42D 25/29; B42D 25/30; B42D 25/355; B42D 25/373; B42D 25/378; B42D 25/382; B42D 25/387; C08L 61/06; C08L 61/12; C08L 61/28; C08L 61/30; C08L 61/34; C09B 67/0013; C09B 67/0033; C09B 67/0097; C09D 11/037; C09D 11/50; C09D 11/54; C09K 11/025; C09K 11/06; C09K 9/02; C09K 2211/1007; C09K 2211/1018; C09K 2211/1475; C09K 2211/1491; D21H 21/30; D21H 21/40; G07D 7/003; G07D 7/1205; G07D 2207/00; C08G 12/34; C08G 14/10; C08G 8/24
See application file for complete search history.

(56) References Cited

U.S. PATENT DOCUMENTS

| | | |
|---|---|---|
| 4,406,816 A | 9/1983 | Sliwka |
| 4,833,311 A | 5/1989 | Jalon |

(Continued)

FOREIGN PATENT DOCUMENTS

| | | |
|---|---|---|
| DE | 19546757 A1 | 6/1996 |
| DE | 102004063217 A1 | 7/2006 |

(Continued)

OTHER PUBLICATIONS

International Search Report from PCT Application No. PCT/EP2016/001861, dated Mar. 10, 2017.

*Primary Examiner* — Irina S Zemel
(74) *Attorney, Agent, or Firm* — Workman Nydegger

(57) ABSTRACT

The invention relates to a security pigment of core-shell particles, comprising a core based on a thermoplastic material, a shell based on a condensation polymer, and an organic or metalorganic feature substance present in dissolved or finely distributed form in the core, wherein the mass fraction of the shell amounts to more than 25%, preferably 50%, particularly more than 100%, in relation to the mass of the core. The invention further relates to a method for producing the core-shell particles and to value documents having the core-shell particles.

24 Claims, No Drawings

(51) Int. Cl.

| | | |
|---|---|---|
| C08L 61/24 | (2006.01) | |
| C08L 61/06 | (2006.01) | |
| C08L 61/28 | (2006.01) | |
| C08L 61/34 | (2006.01) | |
| C08K 5/00 | (2006.01) | |
| D21H 21/30 | (2006.01) | |
| C08L 61/12 | (2006.01) | |
| C08L 61/30 | (2006.01) | |
| C08L 33/12 | (2006.01) | |
| C08K 3/013 | (2018.01) | |
| C08L 25/06 | (2006.01) | |
| D21H 21/40 | (2006.01) | |
| B42D 25/355 | (2014.01) | |
| B42D 25/373 | (2014.01) | |
| B01J 13/18 | (2006.01) | |
| B01J 13/20 | (2006.01) | |
| B01J 13/22 | (2006.01) | |
| B42D 25/29 | (2014.01) | |

(56) References Cited

U.S. PATENT DOCUMENTS

| | | | |
|---|---|---|---|
| 4,891,505 A | 1/1990 | Jalon | |
| 5,082,757 A | 1/1992 | Keoshkerian et al. | |
| 5,677,100 A * | 10/1997 | Asano | G03G 9/09314 430/110.2 |
| 6,261,483 B1 | 7/2001 | Frank et al. | |
| 7,279,234 B2 * | 10/2007 | Dean | C09K 11/025 252/301.16 |
| 9,327,542 B2 | 5/2016 | Kecht et al. | |
| 2008/0163994 A1 | 7/2008 | Hoppe et al. | |
| 2015/0328915 A1 | 11/2015 | Kecht et al. | |

FOREIGN PATENT DOCUMENTS

| | | |
|---|---|---|
| DE | 102006008245 A1 | 8/2007 |
| DE | 102006008247 A1 | 8/2007 |
| DE | 102012013244 A1 | 1/2014 |
| EP | 0026914 B1 | 10/1982 |
| EP | 0226367 B1 | 2/1990 |
| EP | 0256922 B1 | 7/1991 |
| EP | 1208382 B1 | 4/2006 |
| EP | 0978312 B2 | 4/2007 |
| EP | 1661107 B1 | 7/2009 |
| EP | 1438126 B1 | 7/2012 |
| JP | H06148925 A | 5/1994 |
| WO | 2008141972 A1 | 11/2008 |

* cited by examiner

SECURITY PIGMENT BASED ON CORE-SHELL PARTICLES, AND PRODUCTION METHOD

BACKGROUND

The invention relates to a security pigment based on core-shell particles, in particular a luminescent core-shell particle and a method of producing the same.

Particularly, the invention relates to security features based on special core-shell particles, which can contain various feature substances (in particular organic luminescence dyes, infrared absorbers, thermochromic dyes, and photochromic dyes). Thereby, the stability of the feature substances against external influences (e.g. organic solvents, the action of acids and bases) is massively increased, thus making possible and/or improving their applicability in the area of banknotes in particular.

It is generally known to embed luminescent substances in polymers. For example, EP 1 661 107 B1 describes a PMMA complexed with luminescent rare earth substances. However, by such simple embedding no complete protection and no particular stability against chemical attacks is achieved.

The object of the present invention is to supply a feature substance that is improved vis-à-vis the state of the art. Further, the object of the present invention is to supply a method improved vis-à-vis the state of the art of producing a feature substance.

These objects are achieved by the combinations of features defined in the independent claims. Developments of the invention are the subject matter of the subclaims.

SUMMARY OF THE INVENTION 1. (First Aspect) A security pigment of chemically stable core-shell particles, comprising a core based on a thermoplastic polymer, a shell based on a condensation polymer and an organic or metalorganic feature substance present in dissolved or finely distributed form in the core, wherein the mass fraction of the shell amounts to more than 25%, preferably 50%, particularly more than 100%, relative to the mass of the core, in order to give the core-shell particles chemical stability.

2. (Preferred) The security pigment according to paragraph 1, wherein the thermoplastic polymer is selected from polystyrene (PS), polyacrylates, polyethylene (PE), polypropylene (PP), polycarbonates (PC), polyamides (PA), polyurethanes (PU), polyureas (PH), polyethylene terephthalate (PET) or other polyesters, preferably from polystyrene (PS) or from one of the polyacrylates polymethyl methacrylate (PMMA), polyvinyl acetate (PVAC), polyvinyl chloride (PVC), polyacrylonitrile (PAN), particularly preferably from polystyrene (PS) or polymethyl methacrylate (PMMA).

3. (Preferred) The security pigment according to paragraph 1 or 2, wherein the condensation polymer is selected from aminoplasts, phenoplasts, melamine-formaldehyde resins (MF), melamine-phenol-formaldehyde resins (MPF), phenol-formaldehyde resins (PF), urea-formaldehyde resins (UF), melamine-guanidine-formaldehyde resins or phenol-resorcin-formaldehyde resins, preferably melamine-formaldehyde resins (MF).

4. The security pigment according to any one of paragraphs 1 to 3, wherein the core-shell particle comprises exactly one core and a shell.

5. (Preferred) The security pigment according to any one of paragraphs 1 to 4, wherein the core-shell particle comprises several cores and a shell.

6. (Preferred) The security pigment according to any one of paragraphs 1 to 5, wherein the feature substance is present in the thermoplastic polymer in dissolved form.

7. (Preferred) The security pigment according to any one of paragraphs 1 to 6, wherein the feature substance is a fluorescent or phosphorescent or photochromic or thermochromic feature substance or a UV or IR or VIS absorption dye.

8. (Preferred) The security pigment according to any one of paragraphs 1 to 7, wherein the fluorescent or phosphorescent feature substance is excitable in the UV spectral range, in particular at a wavelength of 365 nm, and emits in the visible spectral range.

9. (Preferred) The security pigment according to any one of paragraphs 1 to 8, wherein the fluorescent or phosphorescent feature substance emits in the IR spectral range, preferably between 700 nm and 2,500 nm.

10. (Preferred) The security pigment according to any one of paragraphs 1 to 9, wherein two different luminescent dyes are present in finely distributed or dissolved form in the core, which form an energy transfer system in which the first luminescent dye after excitation transfers its excitation energy partially or completely to the second luminescent dye.

11. (Preferred) The security pigment according to any one of paragraphs 1 to 10, wherein the security pigment is chemically stable against toluene, ethyl acetate, hydrochloric acid (5%), sodium hydroxide solution (2%) and sodium hypochlorite solution (5% active chlorine) and wherein the feature intensity remaining after the test is higher than 80% of the initial intensity. The security pigment is exposed to the chemical substances for 5 minutes here, preferably for 30 minutes. The test is effected in accordance with the test method A5, preferably A30.

12. (Preferred) The security pigment according to any one of paragraphs 1 to 11, wherein the security pigment is stable against acetone in accordance with test method A5, and wherein the feature intensity remaining after the test is higher than 80% of the initial intensity.

13. (Second Aspect) A method for producing a security pigment of core-shell particles, comprising a solid core based on a thermoplastic polymer, a shell based on a condensation polymer and an organic or metalorganic feature substance present in dissolved or finely distributed form in the core, having
a) the step of dissolving the feature substance together with the thermoplastic polymer in an organic solvent and dispersing the obtained solution in water by means of a surfactant;
b) supplying at a certain pH value the prepolymer units to be polymerized in a condensation reaction, in order to achieve the condensation of the shell-forming polymer around the dispersed droplets of the organic solvent;
c) removing the organic solvent in order to form the core-shell particles with a solid core; and optionally d) reinforcing the shell of the core-shell particles by adding further prepolymer units to be polymerized,
wherein the mass fraction of the shell amounts to more than 25%, preferably 50%, in particular more than 100%, relative to the mass of the core.

14. (Third Aspect) A method for producing a security pigment of core-shell particles, comprising a solid core based on a thermoplastic polymer, a shell based on a condensation polymer and an organic or metalorganic feature substance present in dissolved or finely distributed form in the core, having a) the step of preparing the core based on a thermoplastic polymer, in which the feature substance is present in dissolved or finely distributed form, wherein the thermoplastic polymer has functional groups on its outside, which are suitable for prepolymer units to bind thereto covalently for preparing the shell, b) the step of preparing the shell from prepolymer units polymerizing in a condensation reaction, said units growing directly to the core through reaction with the functional groups of the thermoplastic core, wherein the mass fraction of the shell amounts to more than 25%, preferably 50%, particularly more than 100%, relative to the mass of the core.

15. (Preferred) The method according to paragraph 14, wherein the functional groups are selected from amine groups, amide groups, isocyanate groups, aldehyde groups or hydroxyl groups, preferably amine groups.

16. (Preferred) The method according to paragraph 14 or 15, wherein the functional groups are present at the outer surface of the core based on the thermoplastic polymer at a concentration of $0.1$ nmol/cm$^2$ to $10$ nmol/cm$^2$, preferably $1$ nmol/cm$^2$ to $5$ nmol/cm$^2$.

17. (Fourth Aspect) A method for producing a security pigment of core-shell particles, comprising a solid core based on a thermoplastic polymer, a shell based on a condensation polymer and an organic or metalorganic feature substance present in dissolved or finely distributed form in the core, having a) the step of dissolving an organic or metalorganic feature substance in a thermoplastic polymer to supply in this manner thermoplastic particles with feature substance dissolved therein; and b) the step of incorporating the thermoplastic particles with feature substance dissolved therein obtained in step a) in a duromer matrix, c) the step of grinding the product obtained in step b) to pigment particles, wherein the mass fraction of the shell amounts to more than 25%, preferably 50%, particularly more than 100%, relative to the mass of the core.

18. (Preferred) The method according to paragraph 17, wherein the thermoplastic particles with feature substance dissolved therein supplied in step a) are produced as follows:

dissolving the feature substance together with the thermoplastic polymer in an organic solvent and dispersing the obtained solution in water by means of a surfactant, followed by removing the organic solvent; or incorporating the feature substance in the thermoplastic polymer in the melt, preferably with an extruder, followed by grinding of the solidified polymer.

19. (Preferred) The method according to any one of paragraphs 13 to 18, wherein the feature substance is a fluorescent or phosphorescent or photochromic or thermochromic feature substance or a UV or IR or VIS absorption dye.

20. (Preferred) The method according to any one of paragraphs 13 to 19, wherein the security pigment is stable against toluene, ethyl acetate, hydrochloric acid (5%), sodium hydroxide solution (2%) and sodium hypochlorite solution (5% active chlorine) in accordance with test method A5, preferably A30, wherein the feature intensity remaining after the test is higher than 80% of the initial intensity.

21. (Preferred) The method according to any one of paragraphs 13 to 20, wherein the security pigment is stable against acetone in accordance with test method A5, wherein the feature intensity remaining after the test is higher than 80% of the initial intensity.

22. (Fifth Aspect) An ink concentrate or printing ink, in particular for offset printing, screen printing or steel intaglio printing with a security pigment according to any one of paragraphs 1 to 12.

23. (Sixth Aspect) A polymer composition with a security pigment according to any one of paragraphs 1 to 12, wherein the polymer composition preferably is present in the form of a value document substrate, a security foil, a mottling fiber or a security thread.

24. (Seventh Aspect) A value document, mottling fiber, security thread or security foil with a security pigment according to any one of paragraphs 1 to 12.

DETAILED DESCRIPTION OF THE INVENTION

According to the present invention, the feature substances are embedded in a thermoplastic polymer core, for example of polymethyl methacrylate (PMMA), and enveloped with a shell of a crosslinked polar condensation polymer, for example of melamine-formaldehyde resin (MF). As a consequence of its properties as a crosslinked insoluble polymer the shell of MF protects the feature substance in particular against organic solvents. The core of PMMA protects the feature substance against aqueous or strongly polar solvents that could diffuse through the MF. Further, PMMA absorbs most feature substances very well, thus making possible their homogeneous distribution in the core material. In addition to PMMA and MF, other polymer types with similar properties can be employed as well to prepare core-shell particles according to the invention.

According to the invention, a customized, multi-level protection is achieved against a broad spectrum of chemical attacks.

Numerous documents describe the employment of MF as shell material, in most cases for the encapsulation of liquids. Typical application fields are often the preparation of pressure-sensitive micro capsules (for example for the release of fragrances upon rubbing a surface) or slowly permeable micro capsules (for example for the controlled release of drugs and pesticides), see for example EP 0 978 312 B2, EP 1 438 126 B1, EP 0 026 914 B1.

In contrast, the present invention is based on the preparation of highly stable encapsulations with a solid polymer core.

The encapsulation of fluorescent substances with shell materials is generally known. For example, EP 1 208 382 B1 (see example 6 there) describes the enveloping of fluorescent particles with MF. However, these do not reach the stability against chemical attacks required for banknotes, since the shell thicknesses reached are much too low and no complementary protection is present against polar and non-polar attacks. Although the teaching of EP 1 208 382 B1 supplies a certain degree of protection against solvent attacks (which result in the washing out of dyes), the known instability of MF shells against strong acids and bases in particular would require significantly higher wall thicknesses in order to offer sufficient protection against such chemical attacks. The core materials mentioned in EP 1 208 382 B1 are diverse and do not offer specific protection against acid or base attacks.

Further, the documents DE 10 2006 008 245 A1 and DE 10 2006 008 247 A1 address the preparation of security features on the basis of core-shell particles. There, the luminescent substance is not homogeneously dissolved in a polymer core, but is present either directly as a pure substance or as a separately encapsulated pure substance. This results in several disadvantages, such as concentration quenching, insufficient protection against chemicals, as well as a limited selection of suitable luminescent dyes.

The patent EP 0 226 367 B1 describes the agglomeration of fluorescent condensation polymer particles with different polymers to form large agglomerate particles. These particles do not offer complementary protection against organic solvents and/or acids and bases. In addition, no thermoplastic core is used there, which results in technical disadvantages with regard to the incorporation and fine distribution of the dyes.

For preparing the core-shell particles according to the invention, preferably a method is used which is a special development of a so-called "solvent evaporation" process. Said process is often used in the pharmaceutical industry and other fields of micro-encapsulation technology, in order to embed hydrophobic substances (e.g. drugs) in a polymer and/or envelop them with a polymer (see e.g. Tice et al., "Preparation of injectable controlled-release microcapsules by a solvent-evaporation process", Journal of Controlled Release, 2 (1985) 343-352). Here, the substance is dissolved together with a matrix material (e.g. a polymer) in an organic solvent and dispersed in water. Through evaporation of the solvent, the matrix material and the substance contained therein precipitate in the form of small spherical particles or micro capsules. However, no polymer-encapsulated polymer is created thereby.

Many of the micro encapsulations of the state of the art are concerned with the direct encapsulation of (feature) substances with a shell (i.e. the core material is formed by the feature substance). Alternatively, discrete feature substance particles are embedded in a matrix which acts as a core.

In contrast thereto, according to the present invention, the feature substance is preferably dissolved in the core material and is present there in homogeneously distributed form at the molecular level. The advantages include i.a. a reduced concentration quenching upon luminescence, a stronger absorption behavior and a stronger color effect.

Further, in the polymer-based core-shell particles described in the state of the art, no focus is placed on the stabilities against several different solvents, etc. In the state of the art, consequently no specific selection of suitable polymer combinations takes place; these can be found, if at all, only by selection from longer lists of polymers.

In view of the desired properties a number of preferred combinations can be specified for the micro capsules according to the invention:

In comparison to the particles according to the invention, the micro capsules theoretically derivable from the state of the art would not have sufficient stability for use in the banknote field, even with a PMMA core and MF shell, since the shell would not be thick enough. For example, EP 1 208 382 B1 describes in paragraph [0014] a preferred shell proportion of 1 to 20 wt.-% of the core material. However, for the stable core-shell particles according to the invention, the shell proportion is typically over 100 wt.-% of the core material, since otherwise an extraction of fluorescent dyes, for example, can take place by suitable, aggressive solvents, such as acetone.

Thinner shells are advantageous for many applications outside the banknote security field, since no or only a small protective effect of the shell is sufficient there. Through the thinner shell raw material costs are reduced and there is proportionately more functional core material at disposal. Accordingly, many of the micro encapsulation processes employed so far are self-limiting, i.e. the shell is formed by reaction of two or more components, however, an increasing shell thickness slows down the reaction, and prevents further growth (e.g. in the interfacial condensation of reactants in two different phases).

Further, in many other encapsulation reactions, such as in the approach described in EP 1 208 382 B1, the attempt to increase the shell thickness by increasing the concentration of the shell-forming chemicals leads to undesired nucleation and to the preparation of unwanted additional particles in the solution.

The high shell thicknesses of 100 wt.-% or more, with reference to the core material, which are required for a high stability of banknote security features, are therefore not used in the state of the art.

The present invention ensures, independently of the specific production method of the encapsulation, a customized, multi-level protection against a broad spectrum of chemical attacks and includes the preparation of chemically stable security features from a loaded thermoplastic core and a sufficiently thick duromer shell.

According to a preferred embodiment, the core-shell particles consist of a single core which is surrounded by a shell.

According to a preferred embodiment, the core-shell particles according to the invention can be yielded from a solvent evaporation process with simultaneous formation of a duromer shell (case A).

According to a further preferred embodiment, functionalized cores are surrounded by a shell of a condensation polymer whose monomers bind to the functional groups (case B).

According to a further preferred embodiment, the core-shell particles consist of several cores which are embedded together in a shell material.

According to a further preferred embodiment, the core-shell particles are yielded from an extrusion process (case C).

A) Description of the Production Method on the Basis of a Solvent-Evaporation Process with Simultaneous Formation of a Duromer Shell In a first step the feature substances are dissolved in a suitable organic solvent (e.g. in dichloromethane) together with the core material. The solution is dispersed in water with the aid of a surfactant or an emulsifier (e.g. sodium dodecyl sulfate). By adding a melamine-formaldehyde prepolymer and adjusting the correct pH value, a condensation of the MF is reached surrounding the dispersed droplets of the organic solvent. When the organic solvent is removed now, for example by raising the temperature just below the boiling temperature of the organic solvent, the solutes precipitate again, but remain enveloped by the MF. In a second step, the MF-shell is then strengthened (in particular by adding more MF prepolymer, optionally at elevated temperature). For the shell, the presence of dispersed droplets of the liquid organic phase is necessary. If the organic solvent is removed first and MF prepolymer is added then, no sealing enveloping with MF will take place.

B) Description of the Production Method on the Basis of a Binding to Functional Groups In a first step, polymer particles are prepared which bear suitable functional groups on their outer surface, so that the condensation polymer (or its monomers) added in a second step can bind thereto. For example, PMMA microspheres functionalized with amino groups (e.g. produced by aminolysis of PMMA with diaminoalkanes) can be reacted making use of shear forces in an acidified aqueous solution (pH~5) with a melamine-formaldehyde prepolymer to supply the PMMA particles with an MF shell. The functionalization of the PMMA particles here ensures a direct growing of the MF shell around the PMMA particles.

C) Description of the Production Method on the Basis of an Extrusion Process In a first step, thermoplastic particles loaded with feature substance are prepared, for example by dissolving the thermoplastic and the feature substance in an organic solvent, dispersing the solvent in an aqueous surfactant solution, and removing the organic solvent by evaporation.

In a second step, composite polymer particles are prepared by incorporating the thermoplastic particles in a polymer or the precursor of a polymer through an extruder, e.g. a twin screw extruder, for example as part of a thermally controlled reaction extrusion. This polymer is referred to as "putty polymer", since it interconnects the thermoplastic particles like a putty. The extruded putty polymer (which contains the thermoplastic particles) is then brought to a suitable grain size, for example by grinding. The putty polymer particles are reacted in an aqueous acidified solution making use of shear forces with an MF prepolymer in order to supply them with an MF shell.

Preferably a polymer is used as the putty polymer that has free reactive groups on the surface, e.g. hydroxyl or amino groups, in order to allow for a direct growth of the MF shell to the particles. Particularly preferably the putty polymer is strongly crosslinked polyurethane or polyurea. The putty polymer here acts as a kind of agent to allow a growth of the MF shell to the thermoplastic polymer which does normally not bind to MF.

Likewise, further production methods or variations of the production methods introduced here are conceivable to produce the particles according to the invention.

The size of the resulting core-shell particles is in a range of 0.1 µm to 100 µm, preferably 0.5 µm to 20 µm, further preferably 0.8 µm to 5 µm, particularly preferably 1 µm to 3 µm.

The mass fraction of the shell always amounts to more than 25% of the mass of the thermoplastic core material, preferably more than 50% of the mass of the thermoplastic core material, particularly preferably more than 100% of the mass of the thermoplastic core material.

The proportion of the feature substance in the core material preferably amounts to between 0.01 to 50 weight percent, particularly preferably between 0.1 to 30 weight percent, very particularly preferably between 1 and 15 weight percent.

Preferably the core-shell particles according to the invention have a weight proportion of foreign particles, such as e.g. shell particles without a core possibly created through foreign nucleation in the case of a solution-based synthesis, of less than 15%, particularly preferably of less than 1.5%.

The polymer of the core material consists of thermoplastics, preferably of a thermoplastic, non-crosslinked polymer. According to a preferred embodiment, the polymer of the core material consists of polymerized ethylene derivatives, further preferably of polystyrene (PS) or polyacrylates, including preferably polymethyl methacrylate (PMMA), polyvinyl acetate (PVAC), polyvinyl chloride (PVC), polyacrylonitrile (PAN) or of a copolymer containing two or several of these polymers, such as e.g. acrylonitrile-butadiene-styrene copolymer (ABS). According to a further preferred embodiment, the ethylene derivatives are polyethylene (PE), polypropylene (PP) or other polymers constructed from aliphatic carbon chains.

According to a further preferred embodiment, the polymer of the core material consists of polycarbonates (PC), polyamides (PA), polyurethanes (PU), polyureas (PH) or polyesters, such as polyethylene terephthalate (PET).

The chain length of the polymers of the core material are preferably in a range from 1,000 to 1,000,000 g/mol, particularly preferably in a range from 50,000 to 250,000 g/mol.

The polymer of the shell material is preferably strongly (i.e. three-dimensionally) crosslinked thermosetting plastics, in particular condensation polymers, in which a monomer has three or more, preferably six potential binding sites. According to a further preferred embodiment, the polymer of the shell material consists of units polymerized through condensation reactions, such as e.g. aminoplasts and phenoplasts, particularly preferably of aminoplasts. Preferably, these are melamine-formaldehyde resins (MF), melamine-phenol-formaldehyde resins (MPF), phenol-formaldehyde resins (PF), urea-formaldehyde resins (UF) and types of resin related thereto, e.g. melamine-guanidine-formaldehyde resins or phenol-resorcin-formaldehyde resins. According to a further preferred embodiment, the formaldehyde in the resin material is completely or partially replaced by a different aldehyde, e.g. by furfural.

According to a further preferred embodiment, the polymer of the shell material consists of polyaddition products, preferably polyaddition products with isocyanate-containing monomers. Preferably, these are strongly crosslinked polyurethanes (PU) and polyureas (PH).

The particles according to the invention protect the feature substance contained therein against harmful external influences, such as for example extraction through organic solvents or decomposition through aqueous acids and bases. For example, for common solvents such as acetone, ethyl acetate, ethanol, toluene, etc., retention rates of over 90% are observed even after over 1 h residence time of the particles in the medium. In contrast, an equivalent sample without duromer shell shows, for example in the same solvent, a retention rate of significantly below 10% already after one minute, i.e. the feature substance is extracted.

When a qualitative stability test of print samples is carried out, frequently a classification is applied to visible effects such as e.g. luminescent pigments which is subdivided into the following levels:

4: no visible change
3: slight change
2: significant change, less than 50% damaged
1: strong change, more than 50% damaged
0: element destroyed Qualitatively, the assessment of stability in the case of VIS-absorbing or luminescent feature substances is effected by means of the above-mentioned levels 0-4 by observing the excited proof with the eye.

Quantitatively, the assessment is effected by machine measurement, for example in the case of luminescence-based feature substances by measuring the emission spectrum with the aid of a fluorescence spectrometer, or in the case of absorption-based feature substances by measuring the absorption spectrum with the aid of a UV/VIS/NIR spectrometer.

According to experience, luminescent proofs with the level 4 ("no visible change") have a luminescence intensity remaining after the test of over 80% with reference to the initial luminescence intensity. Analogously, for other feature substances a remaining signal intensity of over 80% with reference to the initial signal intensity is likewise considered equivalent to "level 4". This is referred to below also as a stability of over 80%.

To be able to assess the stability of the security pigments qualitatively and quantitatively, a test method close to the application is described in the following.

Test method A5 and/or A30:
Incorporating the security pigments in an offset lacquer having a pigmentation of 15 weight percent with a three-roll mill.
Proofing the thus obtained printing ink in offset printing with a weight of the proof of 2 g/m$^2$ on a value title paper ("banknote paper")
Drying the proof at 60° C. for 12 h
Immersing the proof (or a cut-off portion of the proof) in the respective test substance against which the stability of the proof is to be ascertained for a period of 5 minutes (A5) or 30 minutes (A30)
Removing the proof from the test substance and washing off adhering test substance with water
Drying the proof at 60° C. for 2 h
The quantitative stability of the proof against the test substances results from the comparison of the signal intensity of the proof before and after treatment with the test substance (or the comparison of an untreated portion of the proof with a treated portion of the same proof); stability=(intensity after treatment with solvent)/(intensity before treatment with solvent)

The security pigments on the basis of core-shell particles of the present invention in proofs reach the highest level 4 or a stability of >80% for application-relevant solvents, acids and bases, even if proofs of the same unprotected feature substance reach only the lowest level 0.

According to a preferred embodiment, the highest stability level "no visible change" or a stability >80%, preferably >90%, is given in the following application-relevant solvent tests in accordance with test method A5, particularly preferably in accordance with test method A30:

Determination of stability against polar organic solvents (test substance ethyl acetate), non-polar organic solvents (test substance toluene), aqueous acids (test substance HCl, 5 weight percent), aqueous bases (test substance NaOH, 2 weight percent), as well as aqueous redox-active solutions (test substance sodium hypochlorite solution, 5% active chlorine). The exposure time is 5 or preferably 30 minutes to ensure that a sufficiently long contact is established between the security pigment and the test substance.

According to a further preferred embodiment, the mentioned stabilities are fulfilled also for the following application-relevant solvents:
ethanol
trichloroethylene
tetrachloroethylene
xylene
benzine
sodium sulfite solution (10 weight percent)
sulfuric acid (2 weight percent)
ammonia solution (10 weight percent)

According to a preferred embodiment, the security pigments themselves are stable even against particularly aggressive chemical solvents for at least 5 minutes, for example acetone. In particular, acetone is able to attack the majority of organic feature substances of the state of the art.

In general, it should be noted that the printing lacquer employed for the test and/or the substrate which is printed has to be stable itself in the test; this is generally fulfilled for the lacquers and substrates employed in the security printing of value documents. The stability of the printing lacquer/substrate can be checked for example with inert luminescent substances (e.g. inorganic phosphors) or inert absorbing substances (e.g. inorganic color pigments).

As feature substances predominantly organic or metalorganic molecules are suitable that can be dissolved in non-polar organic solvents. The incorporation of inorganic pigment particles or quantum dots, etc. is difficult and therefore not preferred.

According to a preferred embodiment the feature substance is a luminescent dye. According to a preferred embodiment the luminescent dye is a fluorescent dye. According to a further preferred embodiment the luminescent dye is a phosphorescent dye. According to a further preferred embodiment the luminescent dye is a luminescent dye excitable in the UV range, which emits in the visible spectral range. According to a further preferred embodiment said luminescent dye is one that is excitable in the visible spectral range, which emits in the visible spectral range. According to a further preferred embodiment the luminescent dye is one that emits in the infrared range. The dyes can be both purely organic molecules and metalorganic complexes.

According to a preferred embodiment two or more fluorescent or phosphorescent luminescent dyes are mixed to create an energy transfer system or FRET system, in which the first luminescent dye after excitation can emit its excitation energy partially or completely to the second luminescent dye. In the case of such a FRET system one of the luminescent dyes involved is preferably excitable in the UV range and emits in the visible spectral range, while the other luminescent dye is excitable in the visible spectral range and emits in the visible spectral range.

Examples of substance classes of luminescent dyes which are UV-excitable or excitable in the visible spectral range and which emit in the visible spectral range, are purely organic luminescent dyes and luminescent metal complexes. Possible classes of dyes are for example diaryl polyenes, diaryl ethenes, aryl acetylenes, oxazoles, pyrazoles, benzazoles, anthrones, quinones, cyanines, rhodamines, oxazines, phenoxazines, thiazines, phenothiazines, perylenes, terylenes, coumarins, benzoxazinones or benzothiazinones, as well as rare earth metal complexes, such as β-diketonate rare earth metal complexes or dipicolinate rare earth metal complexes, herein preferably neutrally charged rare earth metal complexes. Other classes of organic luminescent dyes can be used as well.

In particular, perylene dyes are preferably used as the dye class for luminescent dyes excitable in the visible spectral range and emitting in the visible range, due to their high light stability.

Examples of suitable luminescent dyes emitting in the infrared range are organic fluorescent dyes or luminescent metal complexes, such as IR-1048, Cy7 or Nd(TTA)$_3$ (neodymium tris-thenoyltrifluoroacetonate).

Examples of FRET systems are e.g. mixtures of a green-yellow excitable fluorescent dye and a green-yellow emitting fluorescent dye, for example a mixture with a weight ratio of 1:15 of 2,9-bis(2,6-diisopropylphenyl)anthra[2,1,9-def: 6,5,10-d'e'f']diisoquinoline-1,3,8,10(2H,9H)-tetraone ($C_{48}H_{42}N_2O_4$, a green excitable perylene dye having an orange luminescence emission, hereinafter referred to as "F-orange"), and N-(2-(4-oxo-4H-benzo[d][1,3]oxazine-2- yl)phenyl)naphthalene-2-sulfonamide ($C_{24}H_{16}N_2O_4S$, a UV excitable luminescent dye having a green luminescence emission, hereinafter referred to as "F-green").

A FRET system can also serve to read out a forensic component in a luminescent pigment. Thus, the acceptor dye can be excited not only by an energy transfer of the donor dye, but also a direct excitation of the acceptor dye can lead to its luminescence. For example, a mixture of F-Orange and F-green can be excited on the one hand in the UV-A range, e.g. at 365 nm (excitation of the F-green followed by energy transfer to F-orange). On the other hand, for a forensic test the F-orange can also be excited directly, for example by light of the wavelength 525 nm. The direct excitation of the acceptor substance can thus be employed to distinguish FRET systems from other dye systems, and offers an additional security level, which can be analyzed e.g. in a laboratory or automatically by sensors.

According to a preferred embodiment the luminescent dye therefore contains an energy transfer system (FRET system), preferably a FRET system of a UV-excitable luminescent dye as the donor and a luminescent dye excitable in the visible range as the acceptor. The acceptor is preferably a perylene dye. The acceptor is preferably employed as forensic marker.

According to a preferred embodiment the feature substance is an absorber dye for invisible radiation, for example an infrared absorber or UV absorber.

Preferably the feature substance is an infrared absorber. Particularly preferably, the infrared absorber has no or only little absorption in the visible spectral range. According to a preferred embodiment the absorbers are narrow-band (e.g. with an FWHM ("full width at half maximum") of less than 200 nm) or sharp-band (e.g. with an FWHM of less than 30 nm) and thus absorb in a narrow spectral range. According to a further preferred embodiment the absorbers absorb in broad-band manner (e.g. with an FWHM of more than 200 nm). According to a preferred embodiment the absorption maximum of the infrared absorber is in the range from 700 nm to 900 nm, preferably in a range of 700 nm to 800 nm, and is therefore suitable to be read out via standard infrared sensors for banknotes. According to a further preferred embodiment, the absorption maximum of the infrared absorber is above 900 nm, further preferably above 950 nm, particularly preferably in the range of 1,000 nm to 1,100 nm, and is thus not detected by standard infrared sensors for banknotes, however can be detected by special infrared sensors for banknotes.

According to a preferred embodiment the absorption maximum or a strong absorption band of the UV absorber is in the UV-A range of 315 nm to 380 nm, particularly preferably in the range of 350 nm to 380 nm. According to a further preferred embodiment the absorption maximum or a strong absorption band of the UV absorber is in the UV-B/C range of 200 nm to 315 nm, further preferably of 220 nm to 290 nm, particularly preferably of 240 nm to 270 nm.

Suitable infrared absorbers are for example commercially available from the company Fujifilm Imaging Colorants (e.g. CCK-55), the company BASF (e.g. Lumogen IR-Absorber), or the company Epolin under the brand name Epolight. For example, Epolight 4101 absorbs in narrow-band manner at 739 nm and shows no perceptible inherent color when incorporated into a polymer in a diluted form. Likewise, for example Epolight 4831 absorbs in narrow-band manner at 1,000 nm, and shows no perceptible inherent color when incorporated into a polymer in a diluted form.

Suitable UV absorbers are for example available from the company BASF under the trade names Tinuvin and Chimassorb. For example, Tinuvin 326 has a strong absorption band at 360 nm and Chimassorb 81 has a strong absorption band at 330 nm.

According to a preferred embodiment the feature substance is a switchable dye. Preferably, it is a thermochromic or photochromic dye. According to a preferred embodiment the switchable dye is a photochromic compound. Preferably, this is a photochromic compound which is switchable between a first visible state and a second visible or invisible state. The switching in one direction is preferably carried out by irradiation with UV light, while the switching back is carried out either by itself (thermally) or by irradiation with visible light.

According to a preferred embodiment the photochromic dyes are also luminescent dyes. Here, both or only one of the switching states of the dye can be capable of luminescence. The various switching states can have identical luminescent properties (e.g. emission at the same wavelength) or different luminescent properties (e.g. change of the emission wavelength after switching operation).

According to a preferred embodiment the absorption band or emission band generated by the switching operation, in particular the generated absorption band, is in the visible spectral range.

According to a further preferred embodiment the absorption band or emission band generated by the switching operation is in the infrared range, e.g. in a range of 700 nm to 900 nm.

Examples of suitable thermochromic dyes are, for example, (a) organic molecules which change their color through structural change upon a change of the temperature, such as 9,9'-bixanthylidene and 10,10'-bianthronylidene; (b) combinations of a leuco dye (e.g. spirolactones, spiropyranes) and a reversible proton donor (e.g. bisphenol A, 1,2,3-triazoles) and a phase change material (e.g. paraffin), which change their color through protonation/deprotonation of the leuco dye upon a change of the temperature; (c) dyes or metal complexes which change their color intensity in temperature-dependent manner, e.g. temperature quenching in europium complexes; and (d) combinations of several dyes having different temperature behavior (e.g. a mixture of terbium and europium complexes, such as described i.a. in the document EP 0 256 922 B1, which can luminesce red or green in temperature-dependent manner).

Here, (a) and (d) are preferred due to the clear color change, and (b) is less preferred due to the complexity and difficult implementation.

Examples of suitable photochromic dyes are for example spiropyranes, stilbenes/azastilbenes, triarylmethanes, nitrones, fulgides, naphthopyranes spirooxazines, quinones and diaryl ethenes. Due to their high light stability diaryl ethenes are preferred. For example, the diaryl ethene BTF6 (=1,2-bis(2-methyl-1-benzothiophene-3-yl)perfluorocyclopentene) in the open ring structure absorbs in the UV range at 200 nm to 300 nm and has no perceptible absorption bands in the visible spectral range, thus is colorless. After irradiation with UV light of the wavelength 254 nm, however, it converts into the closed ring structure which has an absorption band in the visible spectral range at 530 nm, thus is colored. Upon excitation with UV light of the wavelength 315 nm both the closed and the open ring structure emit at 450 nm, thus a luminescent dye is given at the same time.

By waiting (thermal) or irradiation with visible light, e.g. light of the wavelength 400 nm, the closed ring structure can be returned to the open ring structure.

Further, it is possible to prepare more complex codings through a targeted combination (or common encapsulation) of different feature substances, and to prepare feature particles that are suitable for different machine-readable verification methods at the same time.

In addition to the feature substance, further additives can be added to the core material or the shell material, preferably to the core material.

According to a preferred embodiment, so-called plasticizers, such as diethylhexyl adipate, dibutyl phthalate or diisononyl phthalate, are added to the polymer particles. As substance classes, here there can be used diesters of phthalic acid, diesters of adipic acid and diesters of sebacic acid with longer-chain monoalcohols (2-ethylhexanol, isononanol, decyl alcohol, fatty alcohols, benzyl alcohol, glycol ether), triesters of citric acid, phosphoric acid esters of longer-chain aliphatic alcohols, dibenzoic acid esters of aliphatic alcohols, esters of fatty acids with aliphatic alcohols, diesters of polyethylene glycol ethers, esters of resin acids with longer-chain aliphatic alcohols, plasticizers based on epoxidized fatty acid esters or epoxidized oils, carbon plasticizers and chlorinated paraffins. In this manner, the mechanical properties of the polymer core can be adjusted. In particular, the absorbency of the core material for certain feature substances can be increased.

Preferably, 0.1 to 5 weight percent of plasticizer are added relative to the mass of the core material, further preferably 0.2 to 2 wt.-%, particularly preferably 0.3 to 0.6 wt.-%.

According to a further preferred embodiment UV absorbers are added to the core material. In this manner, the light resistance of the feature substance can be improved, for example.

According to a preferred embodiment UV absorbers are added to the core material. In this manner, the light resistance of the feature substance can be improved, for example.

Suitable UV absorbers are commercially available for example from the company BASF under the trade name Tinuvin and Chimassorb, for example Chimassorb 81.

According to a further preferred embodiment dyes are added to the core material. In this manner, the intrinsic coloration of the pigments can be adjusted for example (e.g. red or blue). Likewise, dyes can be employed to modulate the excitation or emission spectra of the feature substances.

The security pigments are preferably employed for the production of value documents. This takes place preferably by printing in a printing ink, in particular for offset printing, screen printing or steel intaglio printing. Instead of introducing the pigments directly into the printing lacquer and/or the printing ink, it is also possible to produce an ink concentrate from the pigments first. Said concentrate has a pigment content of 50%, for example, and can be introduced into the printing lacquer or printing ink later. This has application-technical advantages, such as faster introduction or avoiding dusting during introduction.

Alternatively, the security pigments can also be introduced into a polymer composition, preferably to prepare a master batch, or to produce a value document substrate, a security foil, a mottling fiber or a security thread. This can be effected by extrusion, for example.

The invention will hereinafter be described in more detail with reference to embodiments.

EMBODIMENT EXAMPLE 1

Blue Luminescent Pigment (According to Case A)

2.7 g polystyrene of the average molecular mass 80,000 g/mol, 150 mg 4,4'-bis(2-methoxystyryl)-1,1'-biphenyl ($C_{30}H_{26}O_2$) and 25 mg dibutyl phthalate are dissolved in 50 g dichloromethane while stirring (solution 1A).

7.8 g melamine and 11.1 g paraformaldehyde are stirred in 100 g water at 60° C. for 60 minutes, wherein a clear solution is formed. The solution is filtered through a filter paper to remove any possibly present undissolved particles (solution 1B).

2.5 g sodium dodecyl sulfate (Sigma Aldrich) are dissolved in 247.5 g water (solution 1C).

The solution 1A is added to the solution 1C and dispersed for 30 seconds with a dispersion tool (Ultraturrax). During this time, 20 ml of solution 1B and 1 ml acetic acid are added. Subsequently, the dispersion is stirred further with a magnetic stirrer.

After 2 h stirring at room temperature, the dispersion is heated to 39° C. and maintained at this temperature for 1.5 h to evaporate the dichloromethane. Subsequently, an additional 20 ml of the solution 1B are added and the temperature is raised to 70° C. This temperature is maintained for a further 1.5 hours. The particles obtained are separated from the solution, washed with water and dried at 60° C.

The particles are incorporated at a weight fraction of 15% into an offset lacquer (Sicpa Holding SA) with a three-roll mill. The lacquer is printed on a proof strip with a proof thickness of 2 g/m².

Upon irradiation with UV light of the wavelength 365 nm the previously colorless proof luminesces blue.

The proof shows a high stability against organic solvents and aqueous acids and bases (reaching level 4 "no visible change"), whereas proofs of the pure dye are not resistant.

The quantitative determination of the stability against polar organic solvents (test substance ethyl acetate), non-polar organic solvents (test substance toluene), aqueous acids (test substance HCl, 5 weight percent), aqueous bases (test substance NaOH, 2 weight percent), and aqueous redox-active solutions (test substance sodium hypochlorite solution, 5% active chlorine) in accordance with test method A30 and acetone in accordance with test method A5 yields respectively a stability of more than 95%.

EMBODIMENT EXAMPLE 2

Red Luminescent Pigment (According to Case B)

"PMMA-NH2-R" refers to amino-functionalized PMMA spheres of the size of 2 μm, with an average molecular weight of the PMMA of 100,000 g/mol and a $NH_2$ functionalization density of 2.25 nmol/cm², which contain 280 mg $Eu(TTA)_3(TPPO)_2$ (TTA=thenoyltrifluoroacetone; TPPO=triphenylphosphine oxide).

7.8 g melamine and 11.1 g paraformaldehyde are stirred in 100 g water at 60° C. for 60 minutes, wherein a clear solution is formed. The solution is filtered through a filter paper to remove any possibly present undissolved particles (solution 2A).

An aqueous solution with 2.7 g PMMA-NH2-R in 250 ml water is treated with 20 ml of solution 2A and 1 ml acetic acid and heated with a linearly increasing temperature profile from 25° C. to 70° C. over 4 hours, making use of gravitational forces. Subsequently, an additional 20 ml of solution 2A are added and the mixture is maintained at 70° C. for a further 1.5 hours.

The particles obtained are separated from the solution, washed with water and dried at 60° C.

The pigment obtained is incorporated at a concentration of 15% into an offset lacquer (hubergroup Deutschland GmbH) with a three-roll mill and proofed with a weight of the proof of 2 g/m² in offset printing. A proof is obtained which fluoresces red in 365 nm excitation light.

The proof shows a high stability against organic solvents and aqueous acids and bases, whereas proofs of the pure dye are not resistant.

The quantitative determination of the stability against polar organic solvents (test substance ethyl acetate), non-polar organic solvents (test substance toluene), aqueous acids (test substance HCl, 5 weight percent), aqueous bases (test substance NaOH, 2 weight percent), and aqueous redox-active solutions (test substance sodium hypochlorite solution, 5% active chlorine) in accordance with test method A30 and acetone in accordance with test method A5 yields respectively a stability of more than 95%.

EXAMPLE 3

Yellow Fluorescent Pigment (According to Case C)

50 g PMMA spheres with an average molecular weight of 100,000 g/mol are dissolved with 2.8 g N-(2-(4-oxo-4H-benzo[d][1,3]oxazine-2-yl)phenyl)naphtalene-2-sulfonamide ($C_{24}H_{16}N_2O_4S$) and 0.2 g 2,9-bis(2,6-diisopropylphenyl)anthra[2,1,9-def: 6,5,10-d'e'f']diisoquinoline-1,3,8,10 (2H,9H)-tetraone in 1 liter dichloromethane. The mixture is placed in a reactor with 5 liters of an aqueous solution of 1% sodium dodecyl sulfate and dispersed with a homogenizer for 5 min. Subsequently, the dichloromethane is evaporated at 500 mbar while stirring. After removal of the dichloromethane, the remaining aqueous phase contains about 53 g spheres of PMMA with an average particle size of about 2 μm, which contain the two dissolved dyes (hereinafter referred to as "PMMA G"). Using an ultracentrifuge, the particles are washed three times with 1 liter of water in each case and subsequently dried at 60° C.

In a laboratory kneader the components
79.63 g of the isocyanurate trimer of isophorone diisocyanate
22.46 g benzamide
2.00 g urea
14.12 g melamine
10 g PMMA G
are kneaded at 180° C. until solidification. The granulate obtained is ground to a grain size (d99) of 11 μm.

From this powder, 50 g are added to 0.65 l water and dispersed with a homogenizer. 450 ml of a 20% aqueous solution of hexahydroxymethyl melamine are added to this mixture and treated with 4 ml of concentrated acetic acid. The reaction mixture obtained is heated at 70° C. for 2 h. The coated pigment obtained is removed by centrifuge and washed with 2 l water. After a final centrifugation step, the pigment is dried at 60° C. in a drying cabinet.

The pigment obtained is incorporated at a concentration of 15% into an offset lacquer (Sicpa Holding SA) with a three-roll mill and proofed with a weight of the proof of 2 g/m² in offset printing. A proof is obtained which fluoresces yellow in 365 nm excitation light.

The proof shows a high stability against organic solvents and aqueous acids and bases, whereas proofs of the pure dyes are not resistant.

The quantitative determination of the stability against polar organic solvents (test substance ethyl acetate), non-polar organic solvents (test substance toluene), aqueous acids (test substance HCl, 5 weight percent), aqueous bases (test substance NaOH, 2 weight percent), and aqueous redox-active solutions (test substance sodium hypochlorite solution, 5% active chlorine) in accordance with test method A30 and acetone in accordance with test method A5 yields respectively a stability of more than 95%.

EMBODIMENT EXAMPLE 4

Photochromic Pigment (According to Case A)

2.7 g polymethyl methacrylate (PMMA) of the average molecular mass 100,000 g/mol and 180 mg cis-1,2-dicyano-1,2-bis(2,4,5-trimethyl-3-thienyl)ethene ($C_{18}H_{18}N_2S_2$) are dissolved in 50 g dichloromethane while stirring (solution 4A).

7.8 g melamine and 11.1 g paraformaldehyde are stirred in 100 g water at 60° C. for 60 minutes, wherein a clear solution is formed. The solution is filtered through a filter paper to remove any possibly present undissolved particles (solution 4B).

2.5 g sodium dodecylsulfate are dissolved in 247.5 g water (solution 4C).

The solution 4A is added to the solution 4C and dispersed for 30 seconds with a dispersion tool (Ultraturrax). During this time, 20 ml of solution 4B and 1 ml acetic acid are added. Subsequently, the dispersion is stirred further with a magnetic stirrer.

The dispersion is stirred for 30 minutes and subsequently stirred at 500 mbar negative pressure for 1 h to evaporate the dichloromethane. Subsequently, an additional 20 ml of the solution 4B are added and the temperature is raised to 70° C. This temperature is maintained for a further 1.5 hours. The particles obtained are separated from the solution, washed with water and dried at 60° C.

The particles are incorporated at a weight fraction of 15% into an offset lacquer (Sicpa Holding SA) with a three-roll mill. The lacquer is printed on a proof strip with a proof thickness of 2 g/m².

Upon irradiation with UV light of the wavelength 330 nm, the proof changes color from colorless to red, and returns to its original color thermally or through irradiation with visible light (e.g. of the wavelength 520 nm).

The proof shows a high stability against organic solvents and aqueous acids and bases (reaching level 4 "no visible change"), whereas proofs of the pure dye are not resistant.

The quantitative determination of the stability against polar organic solvents (test substance ethyl acetate), non-polar organic solvents (test substance toluene), aqueous acids (test substance HCl, 5 weight percent), aqueous bases (test substance NaOH, 2 weight percent), and aqueous redox-active solutions (test substance sodium hypochlorite solution, 5% active chlorine) in accordance with test method A30 and acetone in accordance with test method A5 yields respectively a stability of more than 95%.

EMBODIMENT EXAMPLE 5

Yellow Luminescent Pigment (According to Case B)

"PMMA-NH2-G" refers to amino-functionalized PMMA spheres of the size of 2 with an average molecular weight of the PMMA of 100,000 g/mol and a NH2 functionalization density of 2.25 nmol/cm², which comprise a mixture of 280 mg N-(2-(4-oxo-4H-benzo[d][1,3]oxazine-2-yl)phenyl) naphthalene-2-sulfonamide ($C_{24}H_{16}N_2O_4S$) and 20 mg 2,9-bis(2,6-diisopropylphenyl)anthra[2,1,9-def: 6,5,10-d'e'f'] diisoquinoline-1,3,8,10(2H,9H)-tetraone ($C_{48}H_{42}N_2O_4$).

7.8 g melamine and 11.1 g paraformaldehyde are stirred in 100 g water at 60° C. for 60 minutes, wherein a clear solution is formed. The solution is filtered through a filter paper to remove any possibly present undissolved particles (solution 5A).

An aqueous solution containing 2.7 g PMMA-NH2-R in 250 ml water is treated with 20 ml of solution 5A and 1 ml acetic acid and heated with a linearly increasing temperature profile from 25° C. to 70° C. over 4 hours, making use of gravitational forces. Subsequently, an additional 20 ml of solution 5A are added and the mixture is maintained at 70° C. for a further 1.5 hours.

The particles obtained are separated from the solution, washed with water and dried at 60° C.

The pigment obtained is incorporated at a concentration of 15% into a water-based screen printing ink (Pröll KG) with a three-roll mill and proofed with a weight of the proof of 6 g/m² in screen printing.

A proof is obtained which fluoresces yellow in 365 nm excitation light.

The proof shows a high stability against organic solvents and aqueous acids and bases, whereas proofs of the pure dyes are not resistant.

The quantitative determination of the stability against polar organic solvents (test substance ethyl acetate), non-polar organic solvents (test substance toluene), aqueous acids (test substance HCl, 5 weight percent), aqueous bases (test substance NaOH, 2 weight percent), and aqueous redox-active solutions (test substance sodium hypochlorite solution, 5% active chlorine) in accordance with test method A30 and acetone in accordance with test method A5 yields respectively a stability of more than 95%.

EXAMPLE 6

IR-Absorbing Pigment (According to Case C)

25 g PMMA spheres with an average molecular weight of 80,000 g/mol are dissolved with 1 g of the IR absorber CKK-55 (Fujifilm Imaging Colorants) and 0.25 g dibutyl phthalate in 0.5 liter dichloromethane. The mixture is placed in a reactor with 2.5 liters of an aqueous solution of 1% sodium dodecyl sulfate and dispersed with a homogenizer for 5 min. Subsequently, the dichloromethane is evaporated at 500 mbar while stirring.

After removal of the dichloromethane, the remaining aqueous phase contains about 26 g spheres of PMMA with an average particle size of about 2 μm, which contain dissolved IR absorber CKK-55 (hereinafter referred to as "PMMA CCK-55"). With a ultracentrifuge the particles are washed three times with 1 liter of water in each case and then dried at 60° C.

In a laboratory kneader the components
71.8 g isophorone diisocyanate
22.7 g benzamide
20.09 g melamine
10 g PMMA CKK-55
are kneaded at 180° C. until solidification. The granulate obtained is ground to a grain size (d99) of 11 μm.

Of this powder, 50 g are added to 0.65 l water and dispersed with a homogenizer. 450 ml of a 20% aqueous solution of hexahydroxymethyl melamine are added to this mixture and treated with 4 ml concentrated acetic acid. The reaction mixture obtained is heated at 70° C. for 2 h. The coated pigment obtained is removed by centrifuge and washed with 2l water. After a final centrifugation step, the pigment is dried at 60° C. in a drying cabinet.

The pigment obtained is incorporated at a concentration of 15% into an offset lacquer (hubergroup Deutschland GmbH) with a three-roll mill and is proofed with a weight of the proof of 2 g/m² in offset printing. The proof shows an absorption band in the NIR range at 850 nm.

The proof shows a high stability against organic solvents and aqueous acids and bases, whereas proofs of the pure absorber are not resistant.

The quantitative determination of the stability against polar organic solvents (test substance ethyl acetate), non-polar organic solvents (test substance toluene), aqueous acids (test substance HCl, 5 weight percent), aqueous bases (test substance NaOH, 2 weight percent), and aqueous redox-active solutions (test substance sodium hypochlorite solution, 5% active chlorine) in accordance with test method A30 and acetone in accordance with test method A5 yields respectively a stability of more than 95%.

EXAMPLE 7

Pigment with UV Absorber and Intrinsic Color (According to Case A)

2.7 g polystyrene of the average molecular mass 192,000 g/mol, 100 mg Sudan Blue II (1,4-bis(butylamino)-anthraquinone, $C_{22}H_{26}N_2O_2$) and 50 mg 2-hydroxy-4-(octyloxy) benzophenone $(CH_3(CH_2)_7OC_6H_3(OH)COC_6H_5)$ are dissolved in 50 g ethyl acetate while stirring (solution 7A).

7.8 g melamine and 11.1 g paraformaldehyde are stirred in 100 g water at 60° C. for 60 minutes, wherein a clear solution is formed. The solution is filtered through a filter paper to remove any possibly present undissolved particles (solution 7B).

2.5 g Teepol 610 S (Sigma Aldrich) are dissolved in 247.5 g water (solution 7C).

The solution 7A is added to the solution 7C and dispersed for 30 seconds with a dispersion tool (Ultraturrax). During this time, 20 ml of solution B and 1 ml acetic acid are added. Subsequently, the dispersion is stirred further with a magnetic stirrer.

The dispersion is stirred for 12 h at room temperature to evaporate the ethyl acetate. Subsequently, an additional 20 ml of the solution 7B are added and the temperature is raised to 70° C. This temperature is maintained for a further 1.5 hours. The particles obtained are separated from the solution, washed with water and dried at 60° C.

The pigment obtained is incorporated at a concentration of 15% into a water-based screen printing ink (Pröll KG) with a three-roll mill and proofed with a weight of the proof of 6 g/m² in screen printing. A proof is obtained which is colored blue and in addition has an absorption band in the range of 280-350 nm.

The proof shows a high stability against organic solvents and aqueous acids and bases, whereas proofs of the pure dye and/or absorber are not resistant.

The quantitative determination of the stability against polar organic solvents (test substance ethyl acetate), non-polar organic solvents (test substance toluene), aqueous acids (test substance HCl, 5 weight percent), aqueous bases (test substance NaOH, 2 weight percent), and aqueous redox-active solutions (test substance sodium hypochlorite solution, 5% active chlorine) in accordance with test method A30 and acetone in accordance with test method A5 yields respectively a stability of more than 95%.

The invention claimed is:
1. A security pigment comprising chemically stable core-shell particles, each of the core-shell particles comprising
a core based on a thermoplastic polymer,
a shell based on a condensation polymer, and an organic or metalorganic feature substance present in dissolved or finely distributed form in the core,
wherein the mass fraction of the shell amounts to more than 25%, relative to the mass of the core, such that the core-shell particles are chemically stable, and
wherein the condensation polymer includes an aminoplast, a phenoplast, a melamine-formaldehyde resin (MF), a melamine-phenol-formaldehyde resin (MPF), a phenol-formaldehyde resin (PF), a urea-formaldehyde resin (UF), a melamine-guanidine-formaldehyde resin, or a phenol-resorcin-formaldehyde resin.

2. The security pigment according to claim 1, wherein the thermoplastic polymer includes polystyrene (PS), a polyacrylate, a polyethylene (PE), a polypropylene (PP), a polycarbonate (PC), a polyamide (PA), a polyurethane (PU), a polyurea (PH), polyethylene terephthalate (PET) or another polyester, polyacrylates polymethyl methacrylate (PMMA), polyvinyl acetate (PVAC), polyvinyl chloride (PVC), or polyacrylonitrile (PAN).

3. A security pigment comprising chemically stable core-shell particles, each of the core-shell particles comprising
a core based on a thermoplastic polymer,
a shell based on a condensation polymer, and
an organic or metalorganic feature substance present in dissolved or finely distributed form in the core,
wherein the mass fraction of the shell amounts to more than 25%, relative to the mass of the core such that the core-shell particles are chemically stable, and
wherein the condensation polymer is selected from aminoplasts, phenoplasts, melamine-formaldehyde resins (MF), melamine-phenol-formaldehyde resins (MPF), phenol-formaldehyde resins (PF), urea-formaldehyde resins (UF), melamine-guanidine-formaldehyde resins or phenol-resorcin-formaldehyde resins.

4. The security pigment according to claim 1, wherein each of the core-shell particles comprise exactly one core and a shell.

5. The security pigment according to claim 1, wherein the core-shell particle comprises several core portions and a shell surrounding the several core portions.

6. The security pigment according to claim 1, wherein the feature substance is present in the thermoplastic polymer in dissolved form.

7. The security pigment according to claim 1, wherein the feature substance is a fluorescent or phosphorescent or photochromic or thermochromic feature substance or a UV or IR or VIS absorption dye.

8. The security pigment according to claim 1, wherein the feature substance is a fluorescent or phosphorescent feature substance that is excitable in the UV spectral range, at a wavelength of 365 nm, and emits in the visible spectral range.

9. The security pigment according to claim 1, wherein the feature substance is a fluorescent or phosphorescent feature substance that emits in the IR spectral range.

10. The security pigment according to claim 1, wherein at least two different luminescent dyes are present in finely distributed or dissolved form in the core, which form an energy transfer system in which the first luminescent dye, after excitation, transfers its excitation energy partially or completely to the second luminescent dye.

11. The security pigment according to claim 1, wherein the security pigment is stable against toluene, ethyl acetate, hydrochloric acid (5%), sodium hydroxide solution (2%) and sodium hypochlorite solution (5% active chlorine) in accordance with the test method A5, and wherein the feature intensity remaining after the test is higher than 80% of the initial intensity.

12. The security pigment according to claim 1, wherein the security pigment is stable against acetone in accordance with test method A5, and wherein the feature intensity remaining after the test is higher than 80% of the initial intensity.

13. A method for producing a security pigment of core-shell particles, each of the core-shell particles being produced to comprise a solid core based on a thermoplastic polymer, a shell based on a condensation polymer, and an organic or metalorganic feature substance present in dissolved or finely distributed form in the core, the method comprising:
a) dissolving the feature substance together with the thermoplastic polymer in an organic solvent and dispersing the obtained solution in water by means of a surfactant;
b) supplying at a certain pH value prepolymer units to be polymerized in a condensation reaction such that condensation of the shell-forming polymer around the dispersed droplets of the organic solvent is achieved; and
c) removing the organic solvent such that the core-shell particles are formed with a solid core;
wherein the mass fraction of the shell amounts to more than 25%, relative to the mass of the core, such that the core-shell particles are chemically stable, and
wherein the condensation polymer includes an aminoplast, a phenoplast, a melamine-formaldehyde resin (MF), a melamine-phenol-formaldehyde resin (MPF), a phenol-formaldehyde resin (PF), a urea-formaldehyde resin (UF), a melamine-guanidine-formaldehyde resin, or a phenol-resorcin-formaldehyde resin.

14. A method for producing a security pigment of core-shell particles, each of the core-shell particles being produced to comprise a solid core based on a thermoplastic polymer, a shell based on a condensation polymer, and an organic or metalorganic feature substance present in dissolved or finely distributed form in the core, the method comprising:
a) preparing the core based on a thermoplastic polymer, in which the feature substance is present in dissolved or finely distributed form, wherein the thermoplastic polymer has functional groups on its outside, which are suitable for prepolymer units to bind thereto covalently for preparing the shell;
b) preparing the shell from prepolymer units polymerizing in a condensation reaction, said units growing directly to the core through reaction with the functional groups of the thermoplastic core,
wherein the mass fraction of the shell amounts to more than 25%, relative to the mass of the core, such that the core-shell particles are chemically stable, and
wherein the condensation polymer includes an aminoplast, a phenoplast, a melamine-formaldehyde resin (MF), a melamine-phenol-formaldehyde resin (MPF), a phenol-formaldehyde resin (PF), a urea-formaldehyde resin (UF), a melamine-guanidine-formaldehyde resin, or a phenol-resorcin-formaldehyde resin.

15. The method according to claim 14, wherein the functional groups are selected from amine groups, amide groups, isocyanate groups, aldehyde groups or hydroxyl groups.

16. The method according to claim 14, wherein the functional groups are present at the outer surface of the core based on the thermoplastic polymer at a concentration of 0.1 nmol/cm$^2$ to 10 nmol/cm$^2$.

17. A method for producing a security pigment of core-shell particles, each of the core-shell particles being produced to comprise a solid core based on a thermoplastic polymer, a shell based on a condensation polymer, and an organic or metalorganic feature substance present in dissolved or finely distributed form in the core, the method comprising:
  a) dissolving an organic or metalorganic feature substance in a thermoplastic polymer to supply in this manner thermoplastic particles with feature substance dissolved therein; and
  b) incorporating the thermoplastic particles with feature substance dissolved therein obtained in step a) in a duromer matrix,
  c) grinding the product obtained in step b) to pigment particles,
wherein the mass fraction of the shell amounts to more than 25%, relative to the mass of the core, such that the core-shell particles are chemically stable, and
wherein the condensation polymer includes an aminoplast, a phenoplast, a melamine-formaldehyde resin (MF), a melamine-phenol-formaldehyde resin (MPF), a phenol-formaldehyde resin (PF), a urea-formaldehyde resin (UF), a melamine-guanidine-formaldehyde resin, or a phenol-resorcin-formaldehyde resin.

18. The method according to claim 17, wherein the thermoplastic particles with feature substance dissolved therein supplied in step a) are produced as follows:
  dissolving the feature substance together with the thermoplastic polymer in an organic solvent and dispersing the obtained solution in water by means of a surfactant, followed by removing the organic solvent; or
  incorporating the feature substance in the thermoplastic polymer in the melt, with an extruder, followed by grinding of the solidified polymer.

19. The method according to claim 13, wherein the feature substance is a fluorescent or phosphorescent or photochromic or thermochromic feature substance or a UV or IR or VIS absorption dye.

20. The method according to claim 13, wherein the security pigment is stable against toluene, ethyl acetate, hydrochloric acid (5%), sodium hydroxide solution (2%) and sodium hypochlorite solution (5% active chlorine) in accordance with test method A5, wherein the feature intensity remaining after the test is higher than 80% of the initial intensity.

21. The method according to claim 13, wherein the security pigment is stable against acetone in accordance with the test method A5, wherein the feature intensity remaining after the test is higher than 80% of the initial intensity.

22. An ink concentrate or printing ink for offset printing, screen printing or steel intaglio printing with a security pigment according to claim 1.

23. A polymer composition with a security pigment according to claim 1, wherein the polymer composition is present in the form of a value document substrate, a security foil, a mottling fiber or a security thread.

24. A value document, mottling fiber, security thread or security foil with a security pigment according to claim 1.

* * * * *